(12) United States Patent
Gu et al.

(10) Patent No.: US 7,128,671 B2
(45) Date of Patent: Oct. 31, 2006

(54) HYBRID POWER SYSTEM WITH EXTERNAL AUXILIARY MOTOR

(76) Inventors: Huan-Lung Gu, No. 1, Lane 22, Fu Yi 1 St., Hualian City, Hualian Hsien (TW); Chin-Tai Wu, No. 75, Lane 95, Ying Tao Rd., Yingko, Taipei Hsien (TW); Pan-Hsiang Hsieh, 3F, No. 105, San Chung 1Rd., Chutung Hsinchu, Hsien (TW); Wen-Bin Lee, No. 9, Lane 228, Ming Hsing Road, Chutung, Hsinchu Hsien (TW); Chun-Hsien Lu, No. 390, Niu Pu Road, Hsinchu (TW)

( * ) Notice: Subject to any disclaimer, the term of this patent is extended or adjusted under 35 U.S.C. 154(b) by 0 days.

(21) Appl. No.: 10/886,067

(22) Filed: Jul. 6, 2004

(65) Prior Publication Data

US 2004/0238245 A1 Dec. 2, 2004

Related U.S. Application Data

(63) Continuation of application No. 10/027,541, filed on Dec. 20, 2001, now abandoned.

(51) Int. Cl.
*F16H 63/02* (2006.01)
*B60K 41/02* (2006.01)
*B60W 10/24* (2006.01)

(52) U.S. Cl. ............................. 474/23; 474/15; 474/26; 477/5; 477/6; 477/8; 477/14; 180/65.2; 180/65.4

(58) Field of Classification Search ................ 474/12, 474/15, 23, 69, 70, 18, 28, 26, 11, 13; 180/65.2, 180/65.4, 65.7; 74/665 A, 665 B, 665 G; 192/105 CD; 477/5–6, 8, 14, 39, 77, 80
See application file for complete search history.

(56) References Cited

U.S. PATENT DOCUMENTS

| | | | | |
|---|---|---|---|---|
| 2,690,243 A | * | 9/1954 | Sherill, Jr. et al. | 192/56.6 |
| 3,082,636 A | * | 3/1963 | Steinlein | 474/23 |
| 3,971,463 A | * | 7/1976 | Zindler | 192/105 CD |
| 3,975,964 A | * | 8/1976 | Adams | 474/15 |
| 4,400,997 A | * | 8/1983 | Fiala | 180/65.2 |
| 4,588,040 A | * | 5/1986 | Albright et al. | 180/165 |
| 4,631,977 A | * | 12/1986 | Kawashima | 74/606 A |
| 4,925,432 A | * | 5/1990 | Miyamaru et al. | 474/69 |
| 4,987,967 A | * | 1/1991 | Kouno | 477/36 |
| 5,193,634 A | * | 3/1993 | Masut | 180/65.2 |
| 5,242,330 A | * | 9/1993 | Tateno | 474/13 |
| 5,755,303 A | * | 5/1998 | Yamamoto et al. | 180/65.2 |
| 5,986,416 A | * | 11/1999 | Dubois | 318/139 |
| 6,109,127 A | * | 8/2000 | Liau | 74/336 B |
| 6,443,871 B1 | * | 9/2002 | Taniguchi et al. | 477/44 |
| 6,659,910 B1 | * | 12/2003 | Gu et al. | 180/65.2 |

FOREIGN PATENT DOCUMENTS

JP 63030612 A * 2/1988

* cited by examiner

*Primary Examiner*—Marcus Charles
(74) *Attorney, Agent, or Firm*—Pro-Techtor Int'l Services

(57) ABSTRACT

A hybrid power system, comprising a first power unit, a secondary shaft, a first transmission device, an auxiliary power unit, and a second transmission device. The first power unit has a primary shaft. The secondary shaft is driven by the primary shaft in a rotational movement. The first transmission device is placed between the primary shaft and the secondary shaft, having a transmission belt, transmitting torque from the primary shaft to the secondary shaft. The auxiliary power unit has an electric motor with a driving shaft, which is parallel to the primary shaft. The second transmission device is placed between the primary shaft and the driving shaft, transmitting torque from the electric motor to the primary shaft.

11 Claims, 1 Drawing Sheet

HYBRID POWER SYSTEM WITH EXTERNAL AUXILIARY MOTOR

CROSS REFERENCE TO RELATED APPLICATIONS

This is a continuation application of applicant's U.S. patent application Ser. No. 10/027,541, filed on Dec. 20, 2001, now abandoned.

BACKGROUND OF THE INVENTION

1. Field of the Invention

The present invention relates to a hybrid power system with an external auxiliary motor, particularly to a hybrid power system having a small internal combustion engine and an external electric motor.

2. Description of Related Art

Conventionally, a vehicle is driven by an internal combustion engine. An internal combustion engine generates power that is transmitted to wheels to drive the vehicle. Since internal combustion engines operate by burning fuel, exhaust gas is produced, polluting air. For protecting the environment, electrically driven vehicles have been developed, having no internal combustion engines, but being driven by electric motors powered by batteries. In an electrically driven vehicle, electric energy stored in a battery is converted to mechanical energy by a motor. Mechanical power is by a gear transmitted to wheels. However, batteries have limited energy storage capabilities, so mileage of electrically driven vehicles is insufficient and generally do not meet motorists' demands. Electrically driven vehicles have therefore been sold only in small quantities and are not widely used. For this reason, vehicles driven by hybrid power systems have been developed, each having an engine and an electric motor. By suitable arranging of a transmission device, varying output of power is generated, with torque of the engine and the electric motor adapted appropriately to each other. Thus effective operation is achieved under various conditions, such as climbing, descending, braking and accelerating. An ideal combination of both motors results inefficient operation with high power output and low exhaust gas generation.

Due to a wide variety of transmission devices, hybrid power systems with varying components and varying effects exist. Currently, hybrid power systems are mostly used in four-wheel cars, with hundreds of systems having been developed and large competition between major car manufacturers.

However, small vehicles which are driven by small engines, like light motorcycles and minicars, have little space and need to be inexpensive. So it is difficult to install transmission devices for hybrid power systems of small vehicles. Consequently, very few hybrid power systems are used in small vehicles. Although some research is being done and several related inventions have been made, there is only a narrow range of applications of hybrid power systems of small vehicles.

A conventional hybrid power systems inmost cases has an electric motor directly connected with an output shaft of an engine, so that the electric motor and the engine drive a common axis, being placed next to the axis, consuming relatively large space. Furthermore, since the electric motor directly drives the axis, without any torque-enhancing gear, the electric motor is required to produce large torque and has consequently a large volume.

Besides, hybrid power systems have been designed which have driving systems between electric motors and engines. However, these driving systems are complicated or not effective.

In conventional art, several patents concerning hybrid power systems have been disclosed. Therein, an epicyclic train is taught, where a sun gear and planet gear is driven by an engine and an electric motor. Power output is at a ring gear. Since no torque converter is installed between the engine and the epicyclic train, any change of speed leads to jerks, with the engine and the electric motor not being adapted to each other. When the engine slows down, there is no way to interrupt power transmission. Thus this power transmission device is impractical.

Therefore, a hybrid power system for small vehicles is not only required to be accommodated in a small space, but also to allow for independent operation of the engine and the electric motor, as well as for smooth adaptation thereof to each other. Furthermore, it is desirable to regenerate electric energy by operating the engine and taking advantage of momentum of the moving vehicle. Then a comprehensive effect of the hybrid power system is achieved. At the same time, a direction of development of small power devices, as for motorcycles and minicars, is marked.

SUMMARY OF THE INVENTION

It is the object of the present invention to provide a hybrid power system with external auxiliary motor which is inexpensive.

In the present invention, an electric motor has a driving shaft which is parallel to a primary axis of an engine and connected thereto by a suitable transmission device. Thus a dual power system for driving a vehicle is formed, effectively allowing to perform the following functions:

1. for starting the vehicle, the electric motor running as a motor, starting the engine;

2. the engine running, driving the vehicle, with the electric motor running idle;

3. the engine running, driving the vehicle, with the electric motor generating electricity, recharging a battery;

4. the engine running, driving the vehicle, with the electric motor in addition driving the vehicle;

5. the vehicle decelerating, with the engine stopped or running idle and the electric motor generating electricity due to slowing momentum of the vehicle.

Since the engine and the electric motor drive different parallel shafts rather than a common shaft, a simple transmission belt is usable as a connection which enhances torque. Therefore a small electric motor is sufficient. By employing a standard engine and a standard electric motor, a simple inexpensive hybrid power system is provided. The present invention is usable in conjunction with two-wheel as well as four-wheel vehicles, ensuring a wide range of applications.

The present invention can be more fully understood by reference to the following description and accompanying drawings.

DETAILED DESCRIPTION OF THE PREFERRED EMBODIMENT

Figure 1:
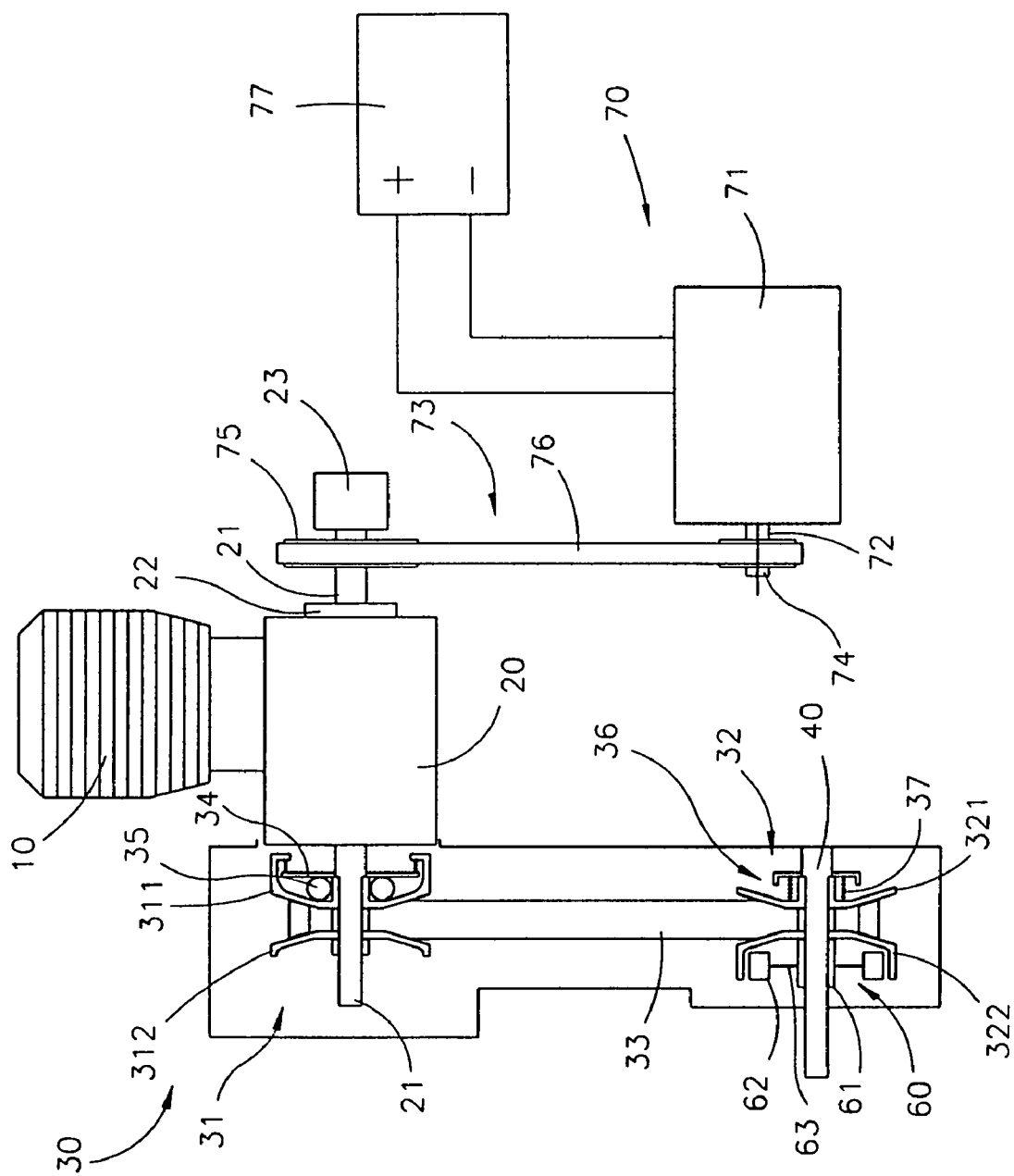
FIG. 1 is a schematic illustration of the hybrid power system with external auxiliary motor of the present invention.

As shown in FIG. 1, the hybrid power system of the present invention in a first embodiment mainly comprises: a first power unit 10; a transmission box 20; a first transmission device 30; a secondary shaft 40; an electric power unit 70; and a second transmission device 73. The first power unit 10 drives an inner part of the transmission box 20 and from there a primary shaft 21. The primary shaft 21 is connected with the first transmission device 30, which in turn drives a rotational movement of the secondary shaft 40. Power from the secondary shaft is finally transmitted to driven wheels of a vehicle.

Any power-generating device is employable as the first power unit 10, being depicted in the Fig. as an internal combustion engine, with the first power unit 10 driving the primary shaft 21 via a crankshaft and a gear (not shown) The primary shaft 21 in turn drives the first transmission device 30.

The first power unit 10 in a normal state drives the primary shaft 21. For starting the first power unit 10, the electric power unit 70 takes along the primary shaft 21. For the case that no electric power is available, a kick starter 22 is attached to the transmission box 20. The kick starter 22 is operated manually for starting the first power unit 10.

The electric power unit 70 includes an electric motor/generator/starter which as an electric motor fills the function of an external auxiliary motor, and is also usable as an electric generator and as a starter, as further explained below. So an electric generator unit does not need to be installed. For generating signals for ignition of the first power unit 10, a signal generator 23 is installed within the transmission box 20, being connected with the primary shaft 21. Therein, a hall sensor generates timing signals for ignition of the first power unit 10.

The first transmission device 30 comprises: a primary wheel 31, put on the primary shaft 21; a secondary wheel 32, put on the secondary shaft 40; and a V-shaped transmission belt 33 between the primary and secondary wheels 31, 32 for having the primary wheel 31 drive the secondary wheel 32. The primary wheel 31 is composed of two cone-shaped wheel plates 311, 312, with a gap left in between. The wheel plate 311 is glidingly movable on the primary shaft 21 in an axial direction. A blocking plate 34 is set on the primary shaft 21, facing an outer side of the wheel plate 311. Several grooves on the outer side of the wheel plate 311 accommodate several balls 35, which are located between the outer side of the wheel plate 311 and the blocking plate 34. When the primary wheel 31 rotates, the balls 35 are by a centrifugal force radially driven away from the primary shaft 21. Then the balls 35 are blocked by the blocking plate 34 while still being exposed to the centrifugal force. A resulting counter-force pushes the wheel plate 311 axially, changing the width of the gap between the wheel plates 311, 312.

The secondary wheel 32 is composed of two cone-shaped wheel plates 321, 322, with a gap left in between. The wheel plate 321 is glidingly movable on the secondary shaft 40 in an axial direction. A torque cam 36 and a spring 37 are inserted between the wheel plate 321 and the secondary shaft 40. Thus the wheel plate 321, when exposed to a changed torque, axially moves along the secondary shaft 40, changing the width of the gap between the wheel plates 321, 322.

The balls 35 and the torque cam 36 cause the wheel plates 311, 312 of the primary wheel 31 and the wheel plates 321, 322 of the secondary wheel 32 to move together or apart according to the rotational speed of the first power unit 10 and torque load. The V-shaped transmission belt 33 has a cross-section with an inclined surface that corresponds to inclinations of the wheel plates 311, 312 and 321, 322. Changing the widths of the gaps between the wheel plates 311, 312 and 321, 322 changes diameters of circumference of the V-shaped transmission belt 33 on the primary and secondary wheels 31, 32, respectively. Thus rotational speed is geared down in the first transmission device by continuous ratios, adapting the rotational speed of the first power unit 10 to torque load.

Furthermore, the first transmission device 30 has a clutch 60. The clutch 60 is either set on the primary shaft 21 or on the secondary shaft 40. In the embodiments shown in the Fig., the clutch 60 is inserted between the secondary shaft 40 and the wheel plate 322 of the second wheel 32. An outer side of the wheel plate 322 is covered with a frictional coating. The clutch 60 comprises a seat 61, several gripping blocks 62 and several springs 63 between the seat 61 and the gripping blocks 62. The seat 61 is fixed on the secondary shaft 40. The several gripping blocks 62 are placed inside the frictional coating of the wheel plate 312 and have inner ends that are connected with the seat 61, with the springs 63 pulling the gripping blocks 62 towards the seat 61. When rotating at a certain rotational speed, the gripping blocks 62 are pushed radially outward by a centrifugal force, pressing on the frictional coating, so that torque from the secondary shaft 40 is transmitted to the secondary wheel 32. The clutch 60 ensures that at a rotational velocity of the secondary wheel 32 below a clutching threshold no torque is transmitted to the secondary wheel 32, avoiding stopping of the engine. Only when the secondary shaft 40 rotates faster, causing the gripping blocks 62 to engage with the frictional coating, the secondary shaft 40 takes along the secondary wheel 32. The secondary shaft 40 has a far end to which a gear is attached, allowing after reducing of speed to transmit torque to driven wheels of the vehicle.

The main characteristic of the present invention lies in the electric power unit 70 being additionally provided. The electric power unit 70 comprises: an electric motor 71, driving a driving shaft 72, which is parallel to the primary shaft 21; and a second transmission device 73, connecting the primary shaft 21 and the driving shaft 72. The second transmission device 73 further comprises a first wheel 74, mounted on the driving shaft 72; a second wheel 75, mounted on the primary shaft 21; and a second transmission belt 76, connecting the first and second wheels 74, 75 and allowing the first and second wheels 74, 75 to drive each other. The first wheel 74 has a diameter which is smaller than the diameter of the second wheel 75, so that torque at the second wheel 75 exceeds torque at the first wheel 74.

The second transmission device 73 preferably has a transmission belt. However, a chain and at least two gear wheels are usable, as well.

The electric power unit 70 is connected to a rechargeable battery 77, supplying the electric power unit 70 with power.

As compared to a conventional hybrid power system, the driving shaft 72 of the electric motor 71 of the present invention is not identical with the primary shaft 21 driven by the first power unit 10, but rather a separate, parallel shaft. The second transmission device 73 connects the primary shaft 21 and the driving shaft 72. Thus the electric motor 71 is placed separately from the primary shaft 21 at any suitable location, reducing the total width of the hybrid power system. Employing the second transmission device 73 allows to various types of electric motors, providing flexibility to use any suitable electric motor that is available on the market, without being bound to special standards.

Furthermore, since the second transmission device 73 enhances torque of the electric motor 71, an electric motor delivering relatively small torque is usable to drive the vehicle. The second transmission device 73 has a simple structure, and the electric motor 71 in addition serves to start the engine and to generate electricity, so no electric starter for the engine and no electric generator are required. This greatly simplifies the structure of the present invention and reduces cost, making the present invention suitable for two-wheel vehicles and light vehicles.

By combining the first power unit 10 and the electric motor 71 and by employing standard control devices and sensors, like a vehicle speed detector, a rotational speed detector and an accelerator sensor, the two power units are separately controlled for effective combining thereof. The underlying logic and principle are explained below.

A. Starting of Vehicle:

If the battery provides sufficient power, the engine is not started. When the vehicle is to be set in motion, the accelerator sensor the electric motor turns the engine, starting the engine. The engine is accelerated to match the position of the accelerator. Power from the electric motor and from the engine are combined, with power from the engine being available at the crankshaft of the transmission box for driving the vehicle. Since the driving axis of the electric motor and the crankshaft of the engine rotate together, output power therefrom is automatically combined, and no jerking movement due to a speed difference will occur. At the same time, the vehicle receives combined power and is rapidly accelerated.

B. Regular Accelerating of Vehicle:

For accelerating the vehicle from starting to a desired speed, for overtaking or for accelerating the engine, depending on various control measures, it is decided which condition is to be used. By sensing accelerator position, driving speed and rotational speed (with the rotational speed of the electric motor representing the rotational speed of the engine), a state of the vehicle is determined. Having determined the state of the vehicle, power of the electric motor is reduced, and power of the engine is increased. Finally the electric motor is switched to run idle, and the vehicle is driven by the engine alone. Since the engine is running sufficiently fast, this is the most efficient way of driving.

C. Generating Electricity with the Vehicle Moving:

If stored electricity runs low, while the vehicle is cruising, the electric power unit is switched to generate electricity. At the same time, the engine is accelerated to drive the vehicle at unaltered speed. The electric power unit generates electricity, recharging the battery as controlled by a control device.

D. Fast Accelerating or Going Uphill while Cruising:

When the accelerator is opened fast to accelerate the vehicle or to go uphill, while the vehicle cruises, a control device switches on the electric power unit, so that power generated by the engine and by the electric motor are combined. Thus production of a large quantity of polluting exhaust gas due to high load of the engine is avoided. Furthermore, the vehicle is provided with additional torque without producing additional noise.

E. Stopping the Vehicle:

When the vehicle is stopped, e.g. at a traffic light or in a traffic jam, the engine is stopped to minimize gas consumption as well as production of exhaust gas. For setting the vehicle in motion again, the electric power unit is caused to operate as a motor, taking along and starting the engine. The engine is accelerated, and power generated by the engine and by the electric motor are combined.

F. Braking while Moving at High Speed:

When the vehicle is braked while moving at high speed, a control circuit stops the engine and cuts supply of fuel. At the same time, the electric power unit is switched to generate electricity, so as to produce electric energy from kinetic energy of the moving vehicle to recharge the battery. If the battery is already fully charged, load by generating electricity is reduced. When the vehicle is not moving anymore, the electric power unit is switched to work as a motor, starting the engine. Alternatively, the engine is started by remaining momentum of the vehicle.

G. Braking while Moving at Low Speed:

If during moving at low speed it is possible to cut off torque from the engine while the rotational speed of the engine is less than a preset value, e.g. by employing the first transmission device or the clutch, so that inertia of the moving vehicle will not reach the engine, the vehicle has to be braked mechanically. However, a control device turns off the engine to reduce production of exhaust gas.

If it is not possible to cut off torque from the engine, braking at low speed is performed like braking at high speed.

H. Starting with Insufficient Electricity:

If stored electricity has run low, making it impossible to operate the electric motor, the engine has to be started manually. The engine is started by the kick starter or a crank. The electric motor remains idle. Having started the engine, the vehicle is accelerated by the engine alone. When driving speed is sufficiently high and the engine produces enough power to drive the vehicle and to have electricity generated, a control device switches the electric power unit to generate electricity to recharge the battery. When a certain level of recharging has not yet been reached and the vehicle is decelerated or stopped, the engine is not turned off, but keeps operating to avoid being unable to be started.

I. Generating Electricity while Parking:

For special circumstances, a switch is installed to keep the engine running when the vehicle has stopped and having the electric power unit generate electricity. The clutch or another device disconnects the engine from driven wheels of the vehicle and allows to accelerate the engine for generating electricity. This special demand is also covered by the present invention.

By operating in various modes, as described above, the present invention adapts to every state of a vehicle, respectively selecting the most suitable mode, so that energy consumption and air pollution are minimized and cruising as well as accelerating are readily controlled. When the vehicle is slowed down or stopped, no noise and no exhaust gas are produced. Furthermore, the present invention has a simple structure, employing standard components, and saves structural parts by not requiring a reverse gear for four-wheel vehicles. Thus costs are greatly reduced, while abilities are extended. The range of applications is large due to applicability to two-wheel as well as four-wheel vehicles, resulting in technical superiority of the present invention among hybrid power systems.

While the invention has been described with reference to a preferred embodiment thereof, it is to be understood that modifications or variations may be easily made without departing from the spirit of this invention which is defined by the appended claims.

The invention claimed is:

1. A hybrid power system with an external auxiliary motor, comprising:
   a first power unit having
      a transmission box, and
      a primary shaft having two output ends projecting through said transmission box, with a first output end projecting beyond a first side of said transmission box and a second output end projecting beyond a second side of said transmission box opposite to said first side;
   a first transmission device having an input end driven by said first output end of said primary shaft and having
      a centrifugally-controlled clutch, and
      a secondary shaft, driven by said centrifugally-controlled clutch, that transmits torque to an axle of a vehicle;
   an electric power unit comprising
      an electric motor/generator/starter,
      a second transmission device having an input end connected to said second output end of said primary shaft and an output end connected to a driving shaft of said electric motor/generator/starter, and
      a rechargeable battery electrically connected to said electric motor/generator/starter;
   wherein said electric power unit has non-simultaneous alternative operating modes as a generator for charging said rechargeable battery, as an electric motor acting as said external auxiliary motor for driving said secondary shaft, and as a starter for starting the vehicle.

2. A hybrid power system with external auxiliary motor according to claim 1, wherein said first power unit comprises an internal combustion engine.

3. A hybrid power system with external auxiliary motor according to claim 2, wherein said first transmission device includes a centrifugally-controlled variable speed drive to drive said secondary shaft.

4. A hybrid power system with external auxiliary motor according to claim 3, wherein said first transmission device includes a primary wheel further comprising:
   a first cone-shaped wheel plate glidingly movable on said primary shaft, having a cone-shaped drive surface and a back surface facing away from said cone-shaped drive surface;
   a second cone-shaped wheel plate mounted on said primary shaft with the cone-shaped surface facing the cone-shaped surface of said first cone-shaped wheel plate;
   a blocking plate mounted on said primary shaft, and positioned near said back surface of said first cone-shaped wheel; and
   a plurality of balls disposed between said back surface of said first cone-shaped wheel plate and said blocking plate;
   wherein said first transmission device acts to provide a centrifugally-controlled variable speed drive to drive said secondary shaft.

5. A hybrid power system with external auxiliary motor according to claim 1, wherein said electric motor/generator/starter when not operating as a motor and not acting as a starter generates electricity to recharge a battery.

6. A hybrid power system with external auxiliary motor according to claim 1, wherein a signal generator is mounted on said primary shaft for generating timing signals for ignition of said first power unit.

7. A hybrid power system with external auxiliary motor according to claim 1, wherein said second transmission device has a chain and two gear wheels, transmitting torque from said electric motor generator/starter to said primary shaft.

8. A hybrid power system with external auxiliary motor according to claim 1, wherein said second transmission device has at least two gear wheels, transmitting torque from said electric motor/generator/starter to said primary shaft.

9. A hybrid power system with external auxiliary motor according to claim 8, wherein a kick starter is mounted for starting said first power unit.

10. A hybrid power system with external auxiliary motor according to claim 1, wherein said first power unit further comprises a transmission box which drives a rotational movement of said primary shaft via said transmission box.

11. A hybrid power system with external auxiliary motor according to claim 1, wherein a kick starter is mounted for starting said first power unit.

* * * * *